3,112,299
SEPARATION OF CATALYSTS FROM ALKYLENE RESINS

Edward T. Borrows, Bowdon, and Dhafir Y. Waddan, Manchester, England, assignors to Shell Oil Company, New York, N.Y., a corporation of Delaware
No Drawing. Filed June 4, 1956, Ser. No. 588,971
Claims priority, application Great Britain June 3, 1955
5 Claims. (Cl. 260—93.7)

This invention relates to methods of separating residual catalysts from alkylene resins. More specifically it relates to methods for removing residual aluminum alkyl catalysts from polyalkylene resins.

In recent years it has been discovered that various alkylenes may be polymerized in the presence of catalysts which are generically termed aluminum alkyls. Such catalysts are sometimes referred to as "Ziegler catalysts." More specifically the polymerization of the monomeric alkylenes is apparently directed to alkylenes having only alpha-unsaturation. The resinous products obtained by polymerizing alpha-alkylene in the presence of aluminum alkyl catalysts are characterized by a number of improved properties over other polyalkylenes which have heretofore been prepared by other processes. As applied to the polyethylene, for example, the products prepared with these catalysts are characterized by higher molecular weight, higher softening points, greater resistance to tearing and breaking, improved solubility characteristics, and the like.

The use of a catalyst of the type described above for the polymerization of the alkylenes has been found to have some disadvantages. One disadvantage is that the polymer thus obtained is not as stable as it might be at high temperatures. This disadvantage is ascribed to the fact that the present methods for removing the catalyst residue from the polymer are not sufficiently efficient. The result is that the finished product contains too much catalyst residue, hence causing the above noted disadvantage.

It is an object of this invention to provide novel methods for separating the residue of aluminum alkyl catalysts from polyalkylene resins. It is another object of this invention to separate substantially all the residue of Ziegler-type catalysts from polyalkylene resins obtained from alpha-olefins. More specifically, it is an object of this invention to provide methods for separating Ziegler-type catalyst residues from polyethylene resins. Other objects will become apparent as the description proceeds.

These and other objects are accomplished by subjecting polyalkylene resins containing aluminum alkyl catalyst residues to the action of an oxidizing agent. More specifically, this invention includes methods for removing aluminum alkyl catalyst residues for polyalkylene resins, said resins being obtained by treating an alpha-olefin with an aluminum alkyl catalyst by subjecting the resinous product to the action of an oxidizing agent.

The methods by which these polymers are prepared using Ziegler catalysts are well known to persons skilled in the art. Briefly, they comprise treating an alpha-olefin, such as ethylene, with an aluminum alkyl catalyst. Reference may be made to Belgian Patent 533,362 for more detailed procedure.

The catalyst may be selected from a large group of aluminum alkyls or mixtures thereof. Typical aluminum alkyls are those having the formula $Al(R)_3$ in which R may be alkyl, aryl, aralkyl, and the like. They include for example, aluminum triethyl, aluminum tripropyl, aluminum triisobutyl, and the like. More recently, however, it has been found that the Ziegler-type catalysts are not limited to aluminum trialkyls but also include various modifications and combinations thereof. Thus, for example, it is known that a catalyst formed by the admixture of at least one compound of a metal of the "a" subgroup of groups IV to VI of the periodic table with the following types of compounds may also be effectively used:

(1) An aluminum trialkyl
(2) An organic compound of zinc or manganese
(3) A compound of the formula $R_1R_2AlX$ in which $R_1$ and $R_2$ are similar or dissimilar and are selected from hydrogen or a hydrocarbon radical and X represents hydrogen, halogen, alkoxy, or aryloxy group, the residue of a secondary amine, secondary acid amide, mercaptan, thiophneol, carboxylic acid, or sulfonic acid.

The metals referred to above as being within the "a" subgroup of groups IV to VI of the periodic table include titanium, zirconium, vanadium, chromium, molybdenum, tungsten, and the like. It is found that salts of some of the compounds may be used with particular advantage, particularly oxychlorides and acetonates of titanium and zirconium.

Specific catalysts which may be used include dimethyl aluminum monobromide, diethyl aluminum monochloride, the reaction product of diisobutyl aluminum chloride and water-free nickel chloride, the reaction product of dibutyl aluminum chloride with water-free palladium chloride, the reaction product of diethyl aluminum chloride and water-free manganese chloride, diethyl aluminum chloride, diethyl aluminum hydride, triphenyl aluminum, a mixture of titanium tetrachloride and diethyl aluminum phenolate, a mixture of zirconium tetrachloride and dimethyl-aminodiethyl aluminum, a mixture of diethyl mercapto-diethyl aluminum and titanium tetrachloride, and the like. Other catalysts and the methods for their preparation are described in Belgian Patent 534,792.

As previously indicated the methods of this invention are directed to the separation of residual aluminum alkyl catalysts from polyalkylene resins. The polyalkylene resins are those that may be prepared from alpha-alkylenes containing up to 6 carbon atoms. They include such alkylenes as hexene-1, pentene-1, butene-1, and the like. Preferably, however, the methods of this invention are particularly effective for lower polyalkylenes having from 2 to 4 carbon atoms such as polyethylene, polypropylene, polybutylene, and the like.

Heretofore, the residual catalyst has been removed by washing a slurry of the polyalkylene resin with common solvents such as lower alcohols and the like. This method has been effective to a degree but it is found to be excessively time consuming and uneconomical and yet does not remove a substantial part of the residue of the catalyst. The methods of this invention provide that after the polyalkylene resin has been formed, it is treated, while slurried in the reaction medium with an oxidizing agent. Thereafter, the polyalkylene is separated from the reaction medium and washed with a selective solvent for the catalyst residue. The reaction medium may be selected from a large variety of organic liquids which may be aliphatic or aromatic. They include, for example, pentane, hexane, cyclohexane, tetrahydronaphthalene, decahydronaphthalene, higher paraffins, aromatic hydrocarbons, such as benzene, xylene, halogenated aromatic hydrocarbons such as orthodichlorobenzene, chlorinated naphthalene, ethers as dibutyl ether, dioxane, tetrahydrofurane, mixtures thereof, and the like. The choice of the reaction medium is usually made strictly upon economic considerations and for that reason hydrocarbons are presently referred.

The oxidizing agent reacts with the residual catalyst thereby rendering it soluble in selective solvents. Therefore, after the oxidizing step, the slurry is filtered and the polymer is recovered. It is then washed with a solvent for the catalyst residue. It is preferred that the wash liquid be selected from a lower alcohol such as methanol, ethanol, propanol, isopropanol, butanol, isobutanol, and the like. Other low molecular weight solvents may likewise be used such as acetone, methylethyl ketone and the like. Additionally, the oxidized aluminum alkyl residue is found to be soluble in other solvents such as water, dilute mineral acid such as hydrochloric acid, and the like.

The variety of liquids that may be used for the reaction medium and for the wash liquid suggests that a single liquid may be used for both purposes. This is found to be the case. Thus, for example, aromatic and aliphatic hydrocarbons such as pentane, isooctane, xylene, benzene, toluene, and the like, may be used for both purposes. Others which may likewise be used include dioxane, tetrahydrofurane, and the like. In these cases, it is not essential that the polymer be washed after it has been treated with the oxidizing agent. It is preferred, however, that it be washed in order to obtain a purer product. In the preferred embodiment, a hydrocarbon is used as the reaction medium for the preparation of the polymer and a lower alcohol is used as the wash liquid.

The treatment with the oxidizing agent is conducted at temperature ranging from about 25° C. to the reflux temperature of the reaction medium with a temperature of about 60° C. being preferred. After the oxidation is complete, the mixture is cooled to about room temperature and filtered and thereafter washed with a solvent for the oxidized aluminum alkyl residue.

The oxidizing agent should be one which will readily react with the aluminum alkyl catalyst residue to form a soluble derivative thereof in the particular wash liquid without being detrimental to the polyalkylene resin. They may be oxidizing gases or other oxidizing agents. The separation is easily and economically accomplished by using an oxidizing gas such as air, oxygen, or ozone. Ozone is least preferred of this group because of its poor stability. A particularly advantageous group of oxidizing agents which may be advantageously utilized in the methods of this invention are organic peroxides such as tertiary butyl peroxide, benzoyl peroxide, hydrogen peroxide, and the like. Various oxidizing salts may likewise be used but, in general, they are not preferred as they may cause a somewhat higher mineral deposit in the final product. Such salts include potassium dichromate, potassium halides, calcium hypochloride, and the like.

The length of time of contact between the oxidizing agent and the polyalkylene resin containing the aluminum alkyl catalyst residue will vary depending upon a number of factors such as the specific catalyst, the particular resin, the size of the batch, the solvent used, and the like. Of considerable importance is the proportion of catalytic material initially used in the polymerization. If greater amounts of catalysts are used, then contact times must be correspondingly increased. The length of contact required or the amount of the oxidizing agent required, may be initially determined by removing samples from the reaction mixture from time to time and igniting them. When the ash content of the samples has reached a minimum, the length of time required for batch operations will thereby be determined.

A number of experiments were conducted to determine the effectiveness of the methods of this invention. Such experiments comprise the preparation of polyalkylenes using different aluminum alkyl catalysts in various inert solvents. The product thus obtained is the polyalkylene resin containing an aluminum alkyl residue in admixture with the reaction medium. A portion of the polyalkylene is treated with oxidizing agents and another portion is washed with a common solvent without treating with an oxidizing agent. The amount of the residual aluminum alkyl is compared by igniting samples of the polyalkylene.

The methods of this invention will be better understood by making reference to the following examples in which the inherent viscosities of the polymers are determined in tetralin at 125° C. and correspond to the formula $$\frac{\log_e \eta \text{rel.}}{c}$$

where $c$ is the concentration of the polymer solution and $\eta$rel. is the relative viscosity of the solution as compared with the solvent.

EXAMPLE I 40 grams of polyethylene, prepared by passing gaseous ethylene through a suspension of 4.05 ccs. aluminum trimethyl and .66 cc. titanium tetrachloride in 600 ccs. of xylene, is slurried with 50 ccs. of methanol at 60° C. The mixture is then cooled to room temperature and filtered. This is followed by washing with methanol, filtering and drying the polyethylene. The polyethylene is then ignited in a porcelain crucible. The ash content is 0.7% by weight of the polyethylene. A 40 g. sample of polyethylene prepared in the same manner is slurried in 600 ccs. of xylene after which anhydrous oxygen is passed through the slurry for one hour. This is followed by filtering and then washing with methanol and again filtering to separate the polyethylene. The polyethylene thus obtained is similarly ignited. The ash content is 0.14% by weight of the polyethylene. The polymer has an inherent viscosity of 7.5.

The procedures of Example I are repeated for other examples using the indicated solvents and ratios of catalyst. The improvement in the removal of the residual catalyst is shown in Table I by comparing the percentage of ash content remaining when oxygen is used by the methods of this invention.

*Table I*

| Example | Catalyst, mole ratio Al:Ti | Solvent | Ash content, % | | Inherent viscosity of polymer |
|---|---|---|---|---|---|
| | | | Treatment with methanol only | Treatment with oxygen and methanol | |
| II | 5:1 | Iso-octane | 1.38 | 0.33 | 7.6 |
| III | 1.25:1 | Xylene | 0.10 | 0.05 | 2.5 |
| IV | 1.25:1 | Iso-octane | 0.17 | 0.07 | 1.2 |

EXAMPLE V

The procedures of Example I are repated except that the catalyst is aluminum triethyl and the oxidizing agent is hydrogen peroxide. Benzene is the wash liquid. A trace of residue remains after igniting the polyethylene whereas considerably high amounts of catalyst residue remain from the untreated portion.

Analogous results are obtained when benzoyl peroxide is used as the oxidizing agent.

EXAMPLE VI

The procedures of Example I are repeated except that the catalyst is the reaction product of diethyl aluminum chloride and water-free manganese chloride. Upon igniting 40 grams of the polyethylene resin a trace of catalyst residue is found.

EXAMPLE VII

The procedure of Example I is repeated except that butylene is polymerized in the presence of a diethyl aluminum chloride-palladium chloride catalyst using toluene as the reaction medium. The slurry thus obtained is air blown for about 15 minutes. The slurry is then filtered and washed with propanol, then dried. It is ignited in a porcelain crucible to yield a trace of aluminum-palladium residue. Comparative tests wherein air was not used showed a considerably high residue content.

EXAMPLE VIII

The procedure of Example I is repeated using propylene as the alkylene. The polymerized product is similarly treated with ozone and found to contain only a trace of residue on ignition.

We claim as our invention:

1. In a process for polymerizing olefins wherein a polymerizable mono-olefinic hydrocarbon is subjected to polymerizing conditions in the presence of an inert liquid hydrocarbon reaction medium and a polymerization catalyst obtained by reacting titanium tetrachloride with an organo-aluminum compound selected from the class consisting of aluminum tri-alkyls, aluminum tri-aryls, dialkyl aluminum halides, and diaryl aluminum halides, whereby there is obtained a hydrocarbon slurry comprising solid polyolefin, active catalyst, and said reaction medium, the steps of contacting said slurry with essentially dry oxygen, separating solid polyolefin from the slurry, and washing the polyolefin with an alcohol of from 1 to 4 carbon atoms per molecule.

2. In a process for polymerizing olefins wherein a polymerizable mono-olefinic hydrocarbon is subjected to polymerizing conditions in the presence of an inert liquid hydrocarbon reaction medium and a polymerization catalyst obtained by reacting titanium tetrachloride with an organo-aluminum compound selected from the class consisting of aluminum tri-alkyls, aluminum tri-aryls, di-alkyl aluminum halides, and di-aryl aluminum halides, whereby there is obtained a hydrocarbon slurry comprising solid polyolefin, active catalyst, and said reaction medium, the steps of contacting said slurry with a member of the group consisting of essentially dry oxygen and air, separating solid polyolefin from the slurry, and washing the polyolefin with an alcohol of from 1 to 4 carbon atoms per molecule.

3. The process of claim 2 which comprises contacting said slurry with air.

4. The process of claim 2 in which the catalyst is obtained by reacting titanium tetrachloride and aluminum trimethyl.

5. The process of claim 2 in which the catalyst is obtained by reacting titanium tetrachloride and aluminum diethyl chloride.

References Cited in the file of this patent

UNITED STATES PATENTS

| | | |
|---|---|---|
| 2,658,059 | Peters et al. | Nov. 3, 1953 |
| 2,692,259 | Peters | Oct. 19, 1954 |
| 2,699,457 | Ziegler | Jan. 11, 1955 |
| 2,827,445 | Bartolomeo | Mar. 18, 1955 |
| 2,845,412 | Heyson | July 29, 1958 |
| 2,905,645 | Anderson et al. | Sept. 22, 1959 |
| 3,012,023 | Anderson et al. | Dec. 5, 1961 |

FOREIGN PATENTS

| | | |
|---|---|---|
| 533,362 | Belgium | May 16, 1955 |
| 534,792 | Belgium | Jan. 31, 1955 |